United States Patent [19]

Leibowitz

[11] 4,240,713

[45] Dec. 23, 1980

[54] ELECTRODE BARRIER LAYER FOR HYDROGEN-COLORED ELECTROCHROMIC DISPLAYS

[75] Inventor: Marshall Leibowitz, Ridgefield, Conn.

[73] Assignee: Timex Corporation, Waterbury, Conn.

[21] Appl. No.: 958,903

[22] Filed: Nov. 8, 1978

[51] Int. Cl.³ ............................................. G02F 1/17
[52] U.S. Cl. ............................................. 350/357
[58] Field of Search ...................... 350/357, 353, 355

[56] References Cited

U.S. PATENT DOCUMENTS

| | | | |
|---|---|---|---|
| 3,836,229 | 9/1974 | Saurer | 350/357 |
| 3,957,352 | 5/1976 | Leibowitz | 350/357 |
| 3,970,365 | 7/1976 | Giglia | 350/357 |
| 3,981,560 | 9/1976 | Heyman et al. | 350/357 |
| 4,012,831 | 3/1977 | Leibowitz | 350/357 |
| 4,120,568 | 10/1978 | Deb et al. | 350/357 |
| 4,170,406 | 10/1979 | Giglia et al. | 350/357 |

*Primary Examiner*—James W. Davie
*Attorney, Agent, or Firm*—Edward J. Timmer

[57] ABSTRACT

The invention provides a transparent electrode barrier layer between the metal oxide electrodes and electrochromic layers thereon in an electrochromic display in which coloration of the electrochromic layers is attributed to the incorporation of protons therein under an applied electrical potential. The electrode barrier layer minimizes the destructive reaction between the metal oxide electrodes and hydrogen from colored electrochromic layers. Display life is thereby substantially improved.

12 Claims, 2 Drawing Figures

ELECTRODE BARRIER LAYER FOR HYDROGEN-COLORED ELECTROCHROMIC DISPLAYS

FIELD OF THE INVENTION

The present invention relates to electrochromic displays and, more particularly, to electrochromic displays in which coloration is attributed to the incorporation of protons into one or more electrochromic layers under the influence of an applied electrical potential.

DESCRIPTION OF THE PRIOR ART

Electrochromic displays are well known in the art and typically comprise a front substrate with selectively actuable transparent electrodes and image-forming electrochromic layers thereon, a rear substrate spaced from the substrate and having a counter electrode thereon and an ion-conducting or electrolyte layer between the substrates. Although many electrochromic materials exist which are useful in these displays, tungsten trioxide alone or admixed with other materials is by far the most widely used. Generally, in prior art electrochromic displays, coloration of the image-forming electrochromic layers of tungsten troixide is thought to proceed by the following reversible reaction:

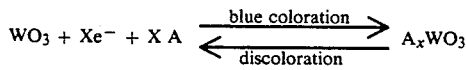

where A is H+ or other cations such as Li+.

In one common electrochromic display, the counter electrode is constructed and conditioned by suitable treatments to function as a source of hydrogen ions during operation of the display. A common counter electrode employed in this type of display comprises a layer of electrochromic material, particularly tungsten trioxide, which is precharged or pretreated to include hydrogen in the form of hydrogen tungsten bronze. However, metals such as lead and palladium, and non-metals such as graphite have also been employed as the counter electrode. The electrolyte employed in this type of display serves as an ionic conductive path by which the hydrogen ions taken up in the tungsten oxide viewing electrode by application of a suitable negative electrical potential thereto can be replaced by oxidizing hydrogen from the counter electrode.

Electrochromic displays of this or similar type are illustrated in the Witzke patent, U.S. Pat. No. 3,840,287 issued Oct. 8, 1974; the Giglia patent, U.S. Pat. No. 3,973,829 issued Aug. 10, 1976; the Berets patent, U.S. Pat. No. 3,843,232 issued Oct. 22, 1974; and the Leibowitz patent, U.S. Pat. No. 4,021,831 issued Mar. 22, 1977.

A disadvantage associated with this and other types of electrochromic displays is that the useful life of such displays has been rather limited as a result of deterioration or destruction of the electrochromic layers and/or transparent electrodes and leads. In one failure mode, the electrochromic layer dissolves in the electrolyte with operating time and temperature as a result of the electrochromic material passing through various intermediate valence or oxidation states during coloration and bleaching during which it is quite soluble in the electrolyte. Attempts by prior art workers to alleviate this problem are exemplified in the Giglia patent, U.S. Pat. No. 3,970,365 issued July 20, 1976; and the Leibowitz patents, U.S. Pat. Nos. 3,957,352 and 4,012,831 issued May 18, 1976 and Mar. 22, 1977 respectively, the latter two of which are of common assignee herewith and teach that a reduction in dissolution of the electrochromic layers can be achieved by adding certain components to the electrolyte with which the layers are in contact. In copending U.S. patent application Ser. No. 953,716 filed Oct. 23, 1978 entitled "Electrochromic Films Having Improved Etch Resistance and Method For Making Same" in the names of Richard Crandall, Brian Faughnan and Marshall Leibowitz as joint inventors and of common assignee herewith, the etch resistance of the electrochromic layers is increased by heat treating the layers at a selected temperature at or above the crystallization temperature of the electrochromic material for a selected short time to convert at least the free surface portion of each layer in contact with the electrolyte from the amorphous to the crystalline form while preventing excessive water loss from the layer.

In another failure mode, the edges of the electrochromic layers have been found to erode over the course of time as a result of excessive current density being present at the edges. The Saurer patent, U.S. Pat. No. 3,836,229 issued Sept. 17, 1974 illustrates this problem and remedies it by covering the affected edge portions with a shield of transparent electrically insulating material such as $CaF_2$, $M_gF_2$, $SiO$, $SiO_2$, and other inorganic materials. Still another recognized problem with certain electrochromic displays involves regions where electrolyte is sandwiched between a transparent electrode or lead and the counter electrode. In these regions, wasteful current flow occurs when a voltage is applied. If inorganic acids, such as sulfuric or phosphoric acid, are used to increase the conductivity of the electrolyte, then the current leakage will cause the transparent electrodes and leads to be rapidly etched away. The Heyman et al patent, U.S. Pat. No. 3,981,560 issued Sept. 21, 1976, proposed solving this problem by covering the transparent electrodes and leads at regions exposed directly to the electrolyte with an organic insulating layer such as well known photoresist materials.

SUMMARY OF THE INVENTION

The present invention relates to electrochromic displays in which coloration of the electrochromic layers is attributed to the incorporation of protons (hydrogen ions) into the layers and which heretofore have exhibited erosion of the transparent metal oxide electrodes and leads beneath the electrochromic layers and at the interfaces between the electrochromic layer, transparent electrode and electrolyte.

Although not wishing to be bound by theory, it is believed that the erosion of the metal oxide electrodes and leads at these locations in the display results from atomic hydrogen possibly forming at recombination sites or from high "x" value hydrogen tungsten bronze of highly colored electrochromic layers and reducing the metal oxide components to the elemental metallic form which may subsequently dissolve in the electrolyte of the display. The present invention involves the interposition of a transparent electrode barrier layer between the metal oxide electrodes and the electrochromic layers thereon to minimize the destructive reaction between nascent hydrogen and the oxide electrodes. In order to maintain proper functioning of the display, i.e., acceptable coloration and bleaching response time, the hydrogen barrier layer must be permeable to electrons under the influence of the applied electrical potential so that the electrons necessary for coloraton and bleaching can pass between the transparent electrodes and electrochromic layers thereon. The barrier layer may be electron permeable by being inherently electron conductive or by permitting tunnelling of electrons therethrough.

In one preferred embodiment of the invention, the atomic hydrogen barrier layer comprises a film of insulating material, such as silicon dioxide or silicon nitride, which physically blocks the flow of leaking hydrogen atoms and which is sufficiently thin so as to allow tunnelling of electrons therethrough under applied potentials. In another preferred embodiment, the barrier layer comprises a layer of gettering material, such as a doped electronically conductive silicon, which bonds with atomic hydrogen and prevents its penetration into the metal oxide electrodes. Intrinsic silicon is also useful in this regard if the layer is sufficiently thin so as to provide for electron tunnelling therethrough. In still another preferred embodiment, the barrier layer comprises a conductive film of crystallized material in which the diffusivity of hydrogen atoms is sufficiently slow to minimize hydrogen penetration to the metal oxide electrodes and/or allow time for formation of molecular hydrogen which does not react with the electrodes, crystallized tungsten trioxide being a preferred material for the diffusion barrier layer.

BRIEF DESCRIPTION OF THE DRAWINGS

Other objects and advantages of the invention may be seen from the following description when viewed in conjunction with the accompanying drawings wherein.

DESCRIPTION OF THE PREFERRED EMBODIMENT

Figure 1:
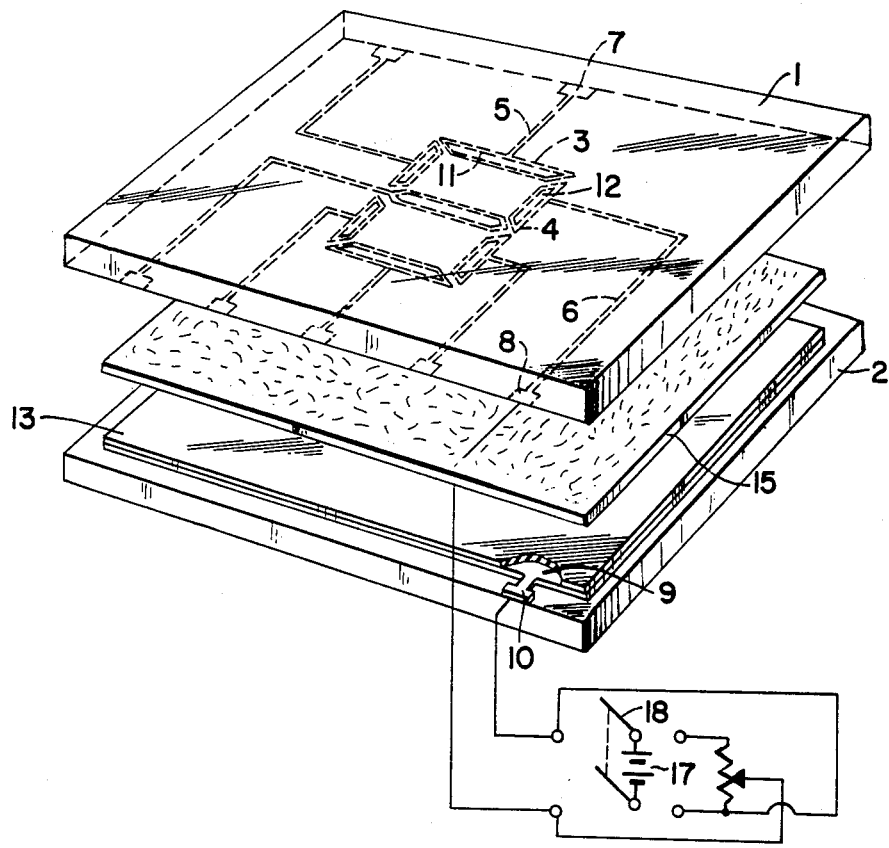
FIG. 1 is an exploded perspective view of a conventional electrochromic display.

Referring now to FIG. 1 of the drawings, a conventional electrochromic display having a sandwich construction of a first transparent substrate 1 and a second spaced substrate 2, which need not be transparent, and electrolyte layer 15 therebetween is shown. Substrate 1 has a conductive pattern of transparent metal oxide electrodes on the underside thereon, such as segments 3, 4 of a pattern which can be selectively actuated to form digits or other optical patterns via conductive leads 5,6 leading to terminals 7,8. Substrate 1 may be of transparent glass or plastic with a selected pattern of transparent electrodes 3,4 thereon of a metal oxide such as, for example, tin oxide or indium oxide admixed with a dopant such as antimony oxide to increase conductivity. The pattern may be etched on the substrate by using a commercially available material known as NESA glass and removing the conductive coating except for electrodes 3,4.

The second substrate has a conductive counter electrode 9 thereon. Substrate 2 may be made of glass, ceramic or plastic coated with a suitable conductive layer to form counter electrode 9 connected to terminal 10. Coated on the transparent electrode segments 3,4 and also on counter electrode 9, if desired, are layers of electrochromic material indicated as 11, 12, 13. The electrochromic layers 11, 12 on segments 3,4 respectively, are applied by suitable masking techniques to cover a smaller area than the electrodes so as to give good edge definition. Preferably, the electrochromic layer 13 on counter electrode 9 is treated in accordance with the Leibowitz patent, U.S. Pat. No. 4,012,831 issued Mar. 22, 1977 to form a special electroreactive layer which serves as a hydrogen source during display operation, the hydrogen migrating as H+ ions to the electrolyte and replacing H+ taken up by the electrochromic layers 11, 12 when the electrodes 3,4 are made negative with respect to the counter electrode 9. When the H+ ions reach layers 11, 12 they are incorporated into the layers as hydrogen tungsten bronze. In this way, electrochromic layers 11, 12 are colored blue for display purposes. Bleaching of the layers is, of course, the reverse process.

Electrolyte layer 15 may take various forms including, but not limited to, liquid electrolytes, gelled electrolytes, paste electrolytes, ion-conducting solids, and ion-exchange resins. These and other types of electrolytes are generally known in the art; for example, see U.S. Pat. Nos. 3,521,941 to Kurmar et al; 3,827,784 to Giglia et al; 3,840,287 to Witzke et al; 3,995,943 to Jasinski; 4,009,036 to Kasia and 4,012,831 to Leibowitz. A preferred electrolyte for use with the embodiment described in detail herein is a solid membrane of a soluble polymer cationic ion exchange resin in acid form and chemically wetted with water, more fully described in the Liebowitz patent, U.S. Pat. No. 4,116,546. In some situations, a porous separator sheet (not shown) may be utilized as a carrier for the electrolyte, for example, as shown in the Leibowitz patent, U.S. Pat. No. 3,944,333.

Figure 2:
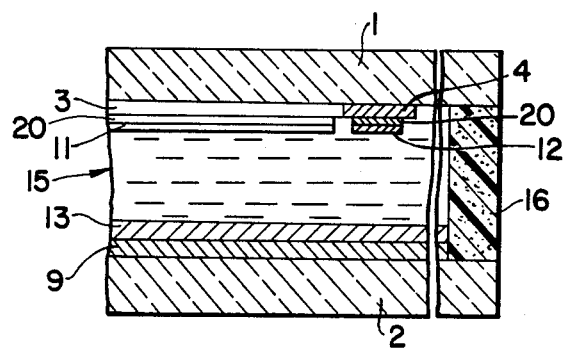
FIG. 2 is an enlarged cross-sectional view of the inventive display showing the hydrogen barrier layer placed between the transparent metal oxide electrodes and electrochromic layer of FIG. 1.

Reference to FIG. 2 shows the assembled display. The two substrates 1 and 2 are attached to one another by an adhesive 16, such as epoxy, and the electrolyte is incorporated into the display in conventional manner. Then the substrates are sealed with adhesive around the remaining sides. Suitable well-known means for actuating the display element includes means for applying an electric field from a battery 17 to a selected segment 4 via terminal 8 and counter electrode 9 via terminal 10. Means for reversing the polarity of the applied voltage to erase the image is indicated symbolically by a two-pole double throw switch 18.

As already mentioned, electrochromic displays of the type described in which coloration of the electrochromic layers is attributed to the incorporation of hydrogen ions into the layers have been known to suffer erosion of the transparent metal oxide, e.g. tin oxide, electrodes and leads beneath and in the vicinity of the electrochromic layers. For example, in FIG. 1 the electrochromic layers 11, 12 are smaller than the transparent electrodes 3,4 and erosion of the electrodes under and around the periphery of the electrochromic layers has been observed. Further, erosion of leads 6,7 at the junction with the electrodes 3,4 has also been observed. It is believed that atomic hydrogen leaks from the highly colored electrochromic layers and reacts with adjacent metal oxide electrodes and leads, reducing them to metallic form. For example, tin oxide is reduced to tin metal or possibly antimony oxide, the dopant, is reduced to antimony metal. The metallic form then in turn dissolves in the electrolyte layer 15, giving rise to the observed erosion. This reduction and dissolution process gradually occurs with time, eventually causing nonfunctioning of the display electrodes and leads.

As shown in FIG. 2, a transparent hydrogen barrier layer 20 is positioned between the electrodes, for example, electrodes 3,4 and the electrochromic layers thereon, for example, layers 11, 12 to prevent atomic hydrogen from the colored electrochromic layers from destructively reacting with the electrodes. Although significant amounts of hydrogen atoms must not be able to pass through the barrier layer, it is important and essential that electrons can do so, since electrical connection of some type between the electrodes and electrochromic layers is absolutely necessary for the coloration reaction to proceed. As a result, the barrier layer must be permeable to electrons under the influence of the applied potential, for example, by being electrically conductive or allowing tunnelling of electrons therethrough. Several barrier layers possessing the desired properties are thought to be useful and preferred in the present invention. One such barrier layer comprises a thin film of insulating material which is thin enough to allow tunnelling of electrons therethrough at electric fields approaching $10^6$ volts/cm (typical field strength in an electrochromic display) but which does not allow the passage of hydrogen in harmful amounts. Preferred films are silicon dioxide or silicon nitride of thicknesses from about 20 to 150 Å. It is important that the thickness be restricted, for thicker films do not allow adequate tunnelling of electrons for coloration purposes.

In another preferred embodiment, the barrier layer 20 comprises a layer of gettering material which bonds in some manner with the leaking hydrogen atoms to essentially immobilize them against penetration through the layer into the metal oxide electrodes and leads. One suitable barrier layer of this type is a thin layer of nonintrinsic silicon which is known to bond with atomic hydrogen but not molecular hydrogen and which is conductive if properly doped, a thickness on the order of about 20 to 150 Å being necessary to maintain adequate viewability. Intrinsic silicon also bonds with atomic hydrogen and thus can be used in the invention so long as the thickness is minimized so as to allow tunnelling of electrons therethrough. To this end, the thickness of an intrinsic silicon barrier layer preferably is from about 20 to 150 Å.

In still another preferred embodiment, the hydrogen barrier layer comprises a conductive film of crystallized material in which the diffusion of hydrogen atoms is sufficiently slow to minimize penetration of atomic hydrogen to the electrodes and allows time for formation of molecular hydrogen which does not attack the oxide electrodes. A preferred diffusion layer includes crystallized tungsten trioxide ($WO_3$). Although the diffusion of protons through electrochromic amorphous $WO_3$ is quite rapid, the diffusion through crystallized $WO_3$ is several orders of magnitude slower. In addition, a crystallized layer of 200 Å thickness is electrically conductive as well as transparent (optical transmission of 85%). If such a crystallized layer is deposited or formed atop an $SnO_2$ electrode with a conventional electrochromic layer overlying the crystallized layer, the display will switch normally but the destruction of the metal oxide electrode will be inhibited. A layer of amorphous $WO_3$ can be placed in the crystallized condition for purposes of the invention by heat treating at 500° C. for 1 to 2 hours. Since the time for hydrogen atoms to diffuse through such layers varies with the square of the layer thickness, the thickness can be selected as desired to achieve minimal hydrogen penetration and yet not unduly increase the total thickness of the display.

The above-mentioned types of hydrogen barrier layers can be deposited on the metal oxide electrodes utilizing conventional techniques such as vapor deposition through suitable masks. Alternatively, the barrier layers can be deposited or applied in other forms over the entire inner surface of the substrate 1. Depending upon the electrical characteristics of the particular barrier layer, it can be left in place on the substrate or suitably etched.

Other barrier layers which may find use in the present invention include silicon monoxide, magnesium fluoride and germanium.

While the invention has been explained by a detailed description of certain specific and preferred embodiments, it is understood that various modifications can be made thereto and it is desired to cover in the appended claims all such modifications as fall within the true spirit and scope of the invention.

I claim:

1. In an electrochromic display comprising a first substrate with a transparent metal oxide electrode and image-forming electrochromic layer thereon, a second spaced substrate with a counter electrode and an ion-conducting layer between the substrates, wherein coloration of the electrochromic layer is attributed to the incorporation of protons in the layer under the influence of an applied electrical field with the attendant generation of some harmful atomic hydrogen therein, the improvement for increasing the useful life of the display comprising:

a transparent hydrogen barrier layer disposed between the metal oxide electrode and associated electrochromic layer for minimizing destructive reaction between said electrode and atomic hydrogen resulting from coloration of the electrochromic layer, said barrier layer being electron permeable under the influence of the applied field so that electrons necessary for coloration can pass between the electrode and electrochromic layer.

2. The display of claim 1 wherein the barrier layer comprises a film of insulating material which film physically blocks the passage of atomic hydrogen and which is sufficiently thin so as to allow tunnelling of electrons therethrough under the applied potential.

3. The display of claim 2 wherein the film comprises silicon dioxide.

4. The display of claim 2 wherein the film comprises silicon nitride.

5. The display of claim 2 wherein the layer is from about 20 to 150 Å in thickness.

6. The display of claim 1 wherein the barrier layer comprises a layer of gettering material which bonds with atomic hydrogen to minimize its penetration to the electrodes and allows electrons to pass therethrough for coloration purposes.

7. The display of claim 6 wherein the film comprises nonintrinsic silicon which is conductive to electrons.

8. The display of claim 6 wherein the film comprises intrinsic silicon having a thickness sufficiently thin so as to allow electrons to tunnel therethrough.

9. The display of claim 6 wherein the layer is from about 20 to 150 Å in thickness.

10. The display of claim 1 wherein the barrier layer comprises a conductive film of crystallized material in which the diffusivity of hydrogen atoms is sufficiently slow so that passage of hydrogen atoms therethrough is minimized.

11. The display of claim 10 wherein the conductive film comprises a crystallized tungsten trioxide layer.

12. The display of claim 11 wherein the crystallized tungsten trioxide layer is from about 20 to 150 Å in thickness.

* * * * *